US008681252B2

(12) United States Patent
Kinugasa

(10) Patent No.: US 8,681,252 B2
(45) Date of Patent: Mar. 25, 2014

(54) PHOTOELECTRIC CONVERSION APPARATUS AND IMAGE PICKUP SYSTEM

(75) Inventor: Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 13/106,755

(22) Filed: May 12, 2011

(65) Prior Publication Data

US 2011/0292263 A1 Dec. 1, 2011

(30) Foreign Application Priority Data

May 25, 2010 (JP) ................................. 2010-119389

(51) Int. Cl.
*H04N 3/14* (2006.01)
*H04N 5/232* (2006.01)

(52) U.S. Cl.
USPC ............................ 348/308; 348/301; 348/350

(58) Field of Classification Search
USPC ......... 348/345, 350, 354, 300, 301, 308, 294; 396/111, 115
See application file for complete search history.

(56) References Cited

U.S. PATENT DOCUMENTS

| 8,184,188 B2 * | 5/2012 | Yaghmai ........................ 348/308 |
| 2003/0146995 A1 * | 8/2003 | Takahashi et al. ............ 348/308 |
| 2003/0150976 A1 | 8/2003 | Mabuchi |
| 2010/0134669 A1 * | 6/2010 | Kinugasa ...................... 348/294 |

FOREIGN PATENT DOCUMENTS

| CN | 1232298 A | 10/1999 |
| CN | 1435721 A | 8/2003 |
| CN | 1604625 A | 4/2005 |
| CN | 1818735 A | 8/2006 |
| JP | 2000-078472 A | 3/2000 |
| JP | 2006-220684 A | 8/2006 |
| JP | 2010-103855 A | 5/2010 |

OTHER PUBLICATIONS

U.S. Appl. No. 13/104,384, filed May 10, 2011, Shinya Ishikawa.
U.S. Appl. No. 13/090,087, filed Apr. 19, 2011, Kenji Kubozono.
U.S. Appl. No. 13/071,044, filed Mar. 24, 2011, Hiroaki Naruse.
U.S. Appl. No. 13/040,172, filed Mar. 3, 2011, Hideo Kobayashi.

* cited by examiner

*Primary Examiner* — Nhan T Tran
(74) *Attorney, Agent, or Firm* — Canon USA, Inc. IP Division

(57) ABSTRACT

In an auto-focusing (AF) sensor, it has been difficult to realize high-speed auto focusing and high-accuracy, auto focusing without increasing the scale of a circuit. In the present invention, a common buffer unit is provided for a plurality of memory cell units that are provided in each unit pixel.

20 Claims, 8 Drawing Sheets

PHOTOELECTRIC CONVERSION APPARATUS AND IMAGE PICKUP SYSTEM

BACKGROUND OF THE INVENTION

1. Field of the Invention

The present invention relates to a photoelectric conversion apparatus, and more particularly to a photoelectric conversion apparatus having a photoelectric conversion unit that performs photoelectric conversion.

2. Description of the Related Art

An image pickup system generally comprises an auto-focusing (AF) sensor that detects focus.

In Japanese Patent Laid-Open No. 2000-078472, a photoelectric conversion apparatus is described that includes a differential amplification unit that amplifies a signal based on an electric charge generated by a photodiode, a capacitor that holds the signal amplified by the differential amplification unit, and a source follower circuit that transmits the signal held in the capacitor to a subsequent stage. It is proposed that, by feeding the output of the source follower circuit back to the differential amplification unit, benefits can be produced in, for example, reduction of fixed pattern noise (FPN) and improvement of gain.

In Japanese Patent Laid-Open No. 2006-220684, an AF apparatus is described in which a frame memory that stores accumulated signals corresponding to regions of a line sensor obtained when the line sensor is divided into a plurality of regions and a frame memory that stores accumulated signals corresponding to all the regions of the line sensor are included. According to Japanese Patent Laid-Open No. 2006-220684, high-speed AF can be performed even if the amount of defocus is large.

With the techniques disclosed in Japanese Patent Laid-Open No. 2000-078472 and Japanese Patent Laid-Open No. 2006-220684, however, it has been difficult to realize both high-speed AF and high-accuracy AF without increasing the scale of a circuit.

SUMMARY OF THE INVENTION

A photoelectric conversion apparatus according to an aspect of the present invention includes a plurality of unit pixels each including a sensor cell unit that includes a photoelectric conversion unit, an amplification unit configured to amplify signals output from the sensor cell unit, a plurality of memory cell units configured to hold the amplified signals, and a buffer unit that is provided for the plurality of memory cell units and transmits the signals held by the plurality of memory cell units. The amplification unit includes a differential amplification unit configured to output a difference between an output of the buffer unit and a signal output from the sensor cell unit.

According to the present invention, it is possible to provide a photoelectric conversion apparatus capable of realizing high-speed AF and high-accuracy AF without increasing the scale of a circuit.

Further features of the present invention will become apparent from the following description of exemplary embodiments with reference to the attached drawings.

DESCRIPTION OF THE EMBODIMENTS

COMPARATIVE EXAMPLE

First, in order to clarify the benefits of the present invention, a comparative example obtained by applying a case in which a plurality of memory cell units are provided for a single sensor cell unit as described in Japanese Patent Laid-Open No. 2006-220684 to a photoelectric conversion apparatus disclosed in Japanese Patent Laid-Open No. 2000-078472 will be described.

Figure 8:
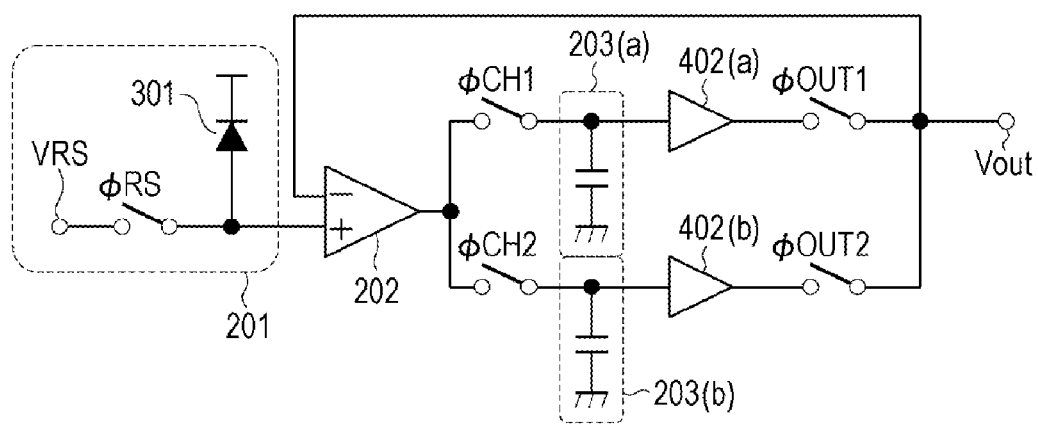
FIG. 8 is a circuit diagram illustrating the configuration of a unit pixel that would be obtained if the technologies disclosed in the related art were combined.

FIG. 8 illustrates an example of a configuration in which the technology described in Japanese Patent Laid-Open No. 2006-220684 is applied to the technology described in Japanese Patent Laid-Open No. 2000-078472. FIG. 8 is a circuit diagram illustrating a part of a photoelectric conversion apparatus in which two memory cell units 203(a) and 203(b) are provided for a single sensor cell unit 201. Here, in accordance with Japanese Patent Laid-Open No. 2000-078472, a configuration is adopted in which a differential amplification unit 202 that amplifies the output of the sensor cell unit 201 and voltage followers 402(a) and 402(b) that amplify the output of the memory cell units 203(a) and 203(b) are included and the output of the voltage followers 402(a) and 402(b) are selectively fed back to an inverting input terminal of the differential amplification unit 202.

In such a configuration, since a plurality of voltage followers are provided for a single sensor cell unit, the scale of a circuit is undesirably increased. Furthermore, unless a noise reduction circuit is provided for each voltage follower, noise generated at each voltage follower cannot be removed. As a result, as well as the operation being complex, the scale of the circuit is further increased, which is undesirable.

Embodiments of the present invention that deal with such problems will be described hereinafter.

First Embodiment

A first embodiment of the present invention will be described with reference to the drawings. A photoelectric conversion apparatus according to the first embodiment is applied to a photoelectric conversion apparatus for phase difference auto focusing (AF).

Figure 1:
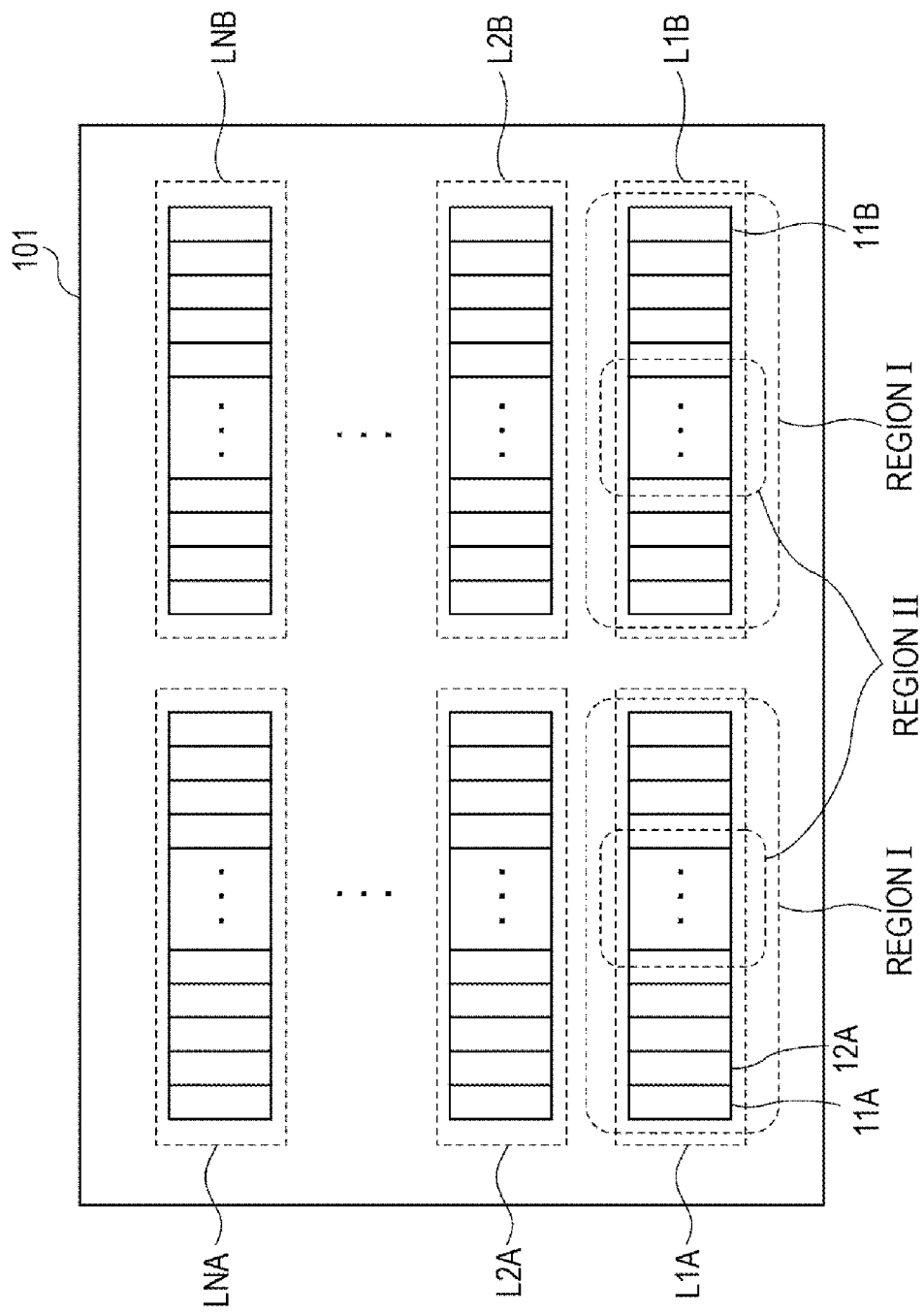
FIG. 1 is a schematic diagram of an image pickup surface of a photoelectric conversion apparatus according to an embodiment of the present invention.

FIG. 1 is a schematic diagram illustrating an image pickup surface 101 of the photoelectric conversion apparatus for phase difference AF. On the image pickup surface 101, pairs of line sensor units L1A and L1B, L2A and L2B, and LNA and LNB are provided. A pair of line sensor units are used to measure the amount of defocus of an object in the region of the image pickup surface 101. By arranging a plurality of pairs of line sensor units, a plurality of range finding points are provided, and therefore the accuracy of AF can be improved. In each line sensor unit, unit pixels 11A, 12A, and so on are arranged in a one-dimensional manner. Regions I and Regions II illustrated in FIG. 1 are regions for controlling the accumulation period when an automatic gain control (AGC) operation, which will be described later, is performed.

Figure 2:
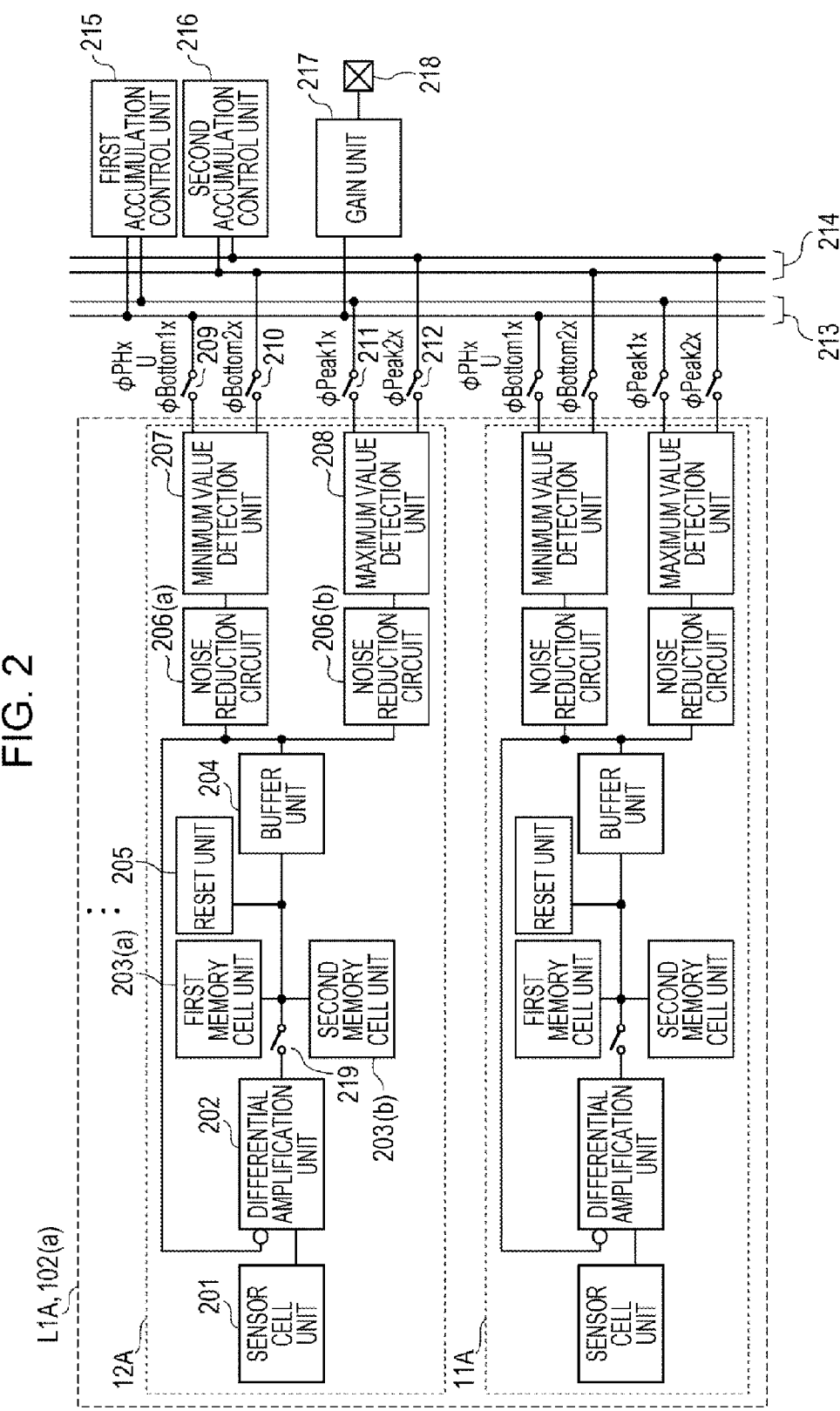
FIG. 2 is a block diagram illustrating the configuration of a line sensor unit in the photoelectric conversion apparatus according to the embodiment of the present invention.

FIG. 2 is a block diagram illustrating a portion relating to the unit pixels 11A and 12A in the line sensor unit L1A in detail.

Because each unit pixel has the same configuration, the unit pixel 12A will be focused upon and described here. The unit pixel 12A has a sensor cell unit 201, a differential amplification unit 202, first and second memory cell units 203(a) and 203(b), a buffer unit 204, a reset unit 205, noise reduction circuits 206(a) and 206(b), a minimum value detection unit 207, and a maximum value detection unit 208.

The output of the sensor cell unit 201 is connected to a non-inverting input terminal of the differential amplification unit 202. The output of the differential amplification unit 202 is connected to the first memory cell unit 203(a), the second memory cell unit 203(b), an input terminal of the buffer unit 204, and the reset unit 205 through a switch 219. The output of the buffer unit 204 is connected to the noise reduction circuits 206(a) and 206(b) and an inverting input terminal of the differential amplification unit 202. The circle drawn on the differential amplification unit 202 in FIG. 2 indicates that the terminal is an inverting input terminal. The output of the noise reduction circuit 206(a) is connected to the minimum value detection unit 207 whereas the output of the noise reduction circuit 206(b) is connected to the maximum value detection unit 208.

The minimum value detection unit 207 has two output terminals, one of which is connected to one of first common output lines 213 through a switch 209 and the other of which is connected to one of second common output lines 214 through a switch 210. The switch 209 is controlled with a signal φPHx or a signal φBottom1x that is supplied from a selection circuit, which is not illustrated. The switch 210 is controlled with a signal φBottom2x that is supplied from the selection circuit, which is not illustrated. Here, the signal φPHx is supplied in accordance with the arrangement of the unit pixels in order to obtain the output of each unit pixel. The signals φBottom1x and φBottom2x are supplied to a plurality of unit pixels at the same time in order to obtain the minimum value from among the outputs of the plurality of unit pixels.

The maximum value detection unit 208 has two output terminals, one of which is connected to the other of the first common output lines 213 through a switch 211 and the other of which is connected to the other of the second common output lines 214 through a switch 212. The switch 211 is controlled with a signal φPeak1x that is supplied from the selection circuit, which is not illustrated. The switch 212 is controlled with a signal φPeak2x that is supplied from the selection circuit, which is not illustrated. Here, the signals (φPeak1x and φPeak2x are supplied to a plurality of unit pixels at the same time in order to obtain the maximum value from among the output of the plurality of unit pixels. The minimum value detection unit 207 and the maximum value detection unit 208 are formed of, for example, source follower circuits. When a plurality of minimum value detection units 207 or a plurality of maximum value detection units 208 are connected to the same node at the same time, only the minimum or maximum signal appears in the node.

The first common output lines 213 are connected to a first accumulation control unit 215, and the second common output lines 214 are connected to a second accumulation control unit 216. The first accumulation control unit 215 controls when to cause the first memory cell unit 203(a) to hold the output of the differential amplification unit 202 based on signals regarding a maximum value and a minimum value that are supplied to the first common output lines 213. Similarly, the second accumulation control unit 216 controls when to cause the second memory cell unit 203(b) to hold the output of the differential amplification unit 202 based on signals regarding a maximum value and a minimum value that are supplied to the second common output lines 214. In addition, one of the first common output lines 213 is also connected to a gain unit 217. In accordance with a signal output from the minimum value detection unit 207, the gain unit 217 outputs, from an output terminal 218, a signal amplified by a certain amount of gain that has been determined by the AGC operation, which will be described later. In FIG. 2, in order to simplify the diagram, signal lines through which signals are supplied from the first accumulation control unit 215 and the second accumulation control unit 216 to the first memory cell unit 203(a) and the second memory cell unit 203(b), respectively are omitted.

The number of first accumulation control units 215, second accumulation control units 216, and gain units 217 need not be the same as that (N in this embodiment) of line sensor units. The first accumulation control unit 215, the second accumulation control unit 216, and the gain unit 217 may be shared by a plurality of line sensor units. In that case, signals supplied through the first common output lines 213 and the second common output lines 214 may be multiplexed.

Figure 3:
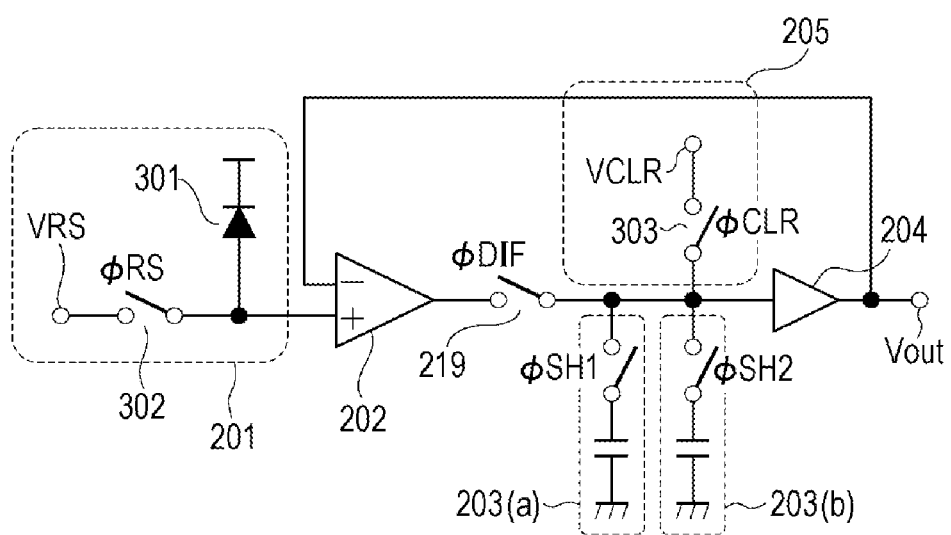
FIG. 3 is a circuit diagram illustrating a part of a unit pixel in the photoelectric conversion apparatus according to the embodiment of the present invention.

FIG. 3 is a circuit diagram illustrating a portion of a unit pixel relating to the sensor cell unit 201, the differential amplification unit 202, the first and second memory cell units 203, the buffer unit 204, the reset unit 205, and the switch 219.

The sensor cell unit 201 includes a photo diode (PD) 301, which is a photoelectric conversion unit, and a switch 302. Power supply voltage VRS is supplied to the anode of the PD 301 through the switch 302. In addition, the anode of the PD 301 is connected to the non-inverting input terminal of the differential amplification unit 202. The switch 302 is controlled with a signal φRS that is supplied from a control unit, which is not illustrated.

The output of the differential amplification unit 202 is connected, through the switch 219 controlled with a signal φDIF that is supplied from the control unit, which is not illustrated, to a node to which the first and second memory cell units 203, the reset unit 205, and the buffer unit 204 are connected.

The first and second memory cell units 203 are each formed by including a capacitor and a switch. The first memory cell unit 203(a) is controlled with a signal φSH1 that is supplied from the first accumulation control unit 215, and the second memory cell unit 203(b) is controlled with a signal φSH2 that is supplied from the second accumulation control unit 216.

The reset unit 205 includes a reset switch 303 that is controlled with a signal φCLR supplied from the control unit, which is not illustrated. Power supply voltage VCLR is supplied to one terminal of the reset switch 303. When closed with the signal φCLR, the reset switch 303 resets the node to which the first and second memory cell units 203 and an input portion of the buffer unit 204 are connected.

The output of the buffer unit 204 is connected to the noise reduction circuits 206 through a terminal Vout as well as to the inverting input terminal of the differential amplification unit 202. For the buffer unit 204, for example, a source follower circuit may be used. With this configuration, the first and second memory cell units 203 sample and hold an electric potential, which has been generated by the PD 301 and changed by a certain amount of offset caused by the buffer unit 204, as a signal level. The buffer unit 204 may be one that has an amplification function in which gain is applied to an input signal.

Figure 4:
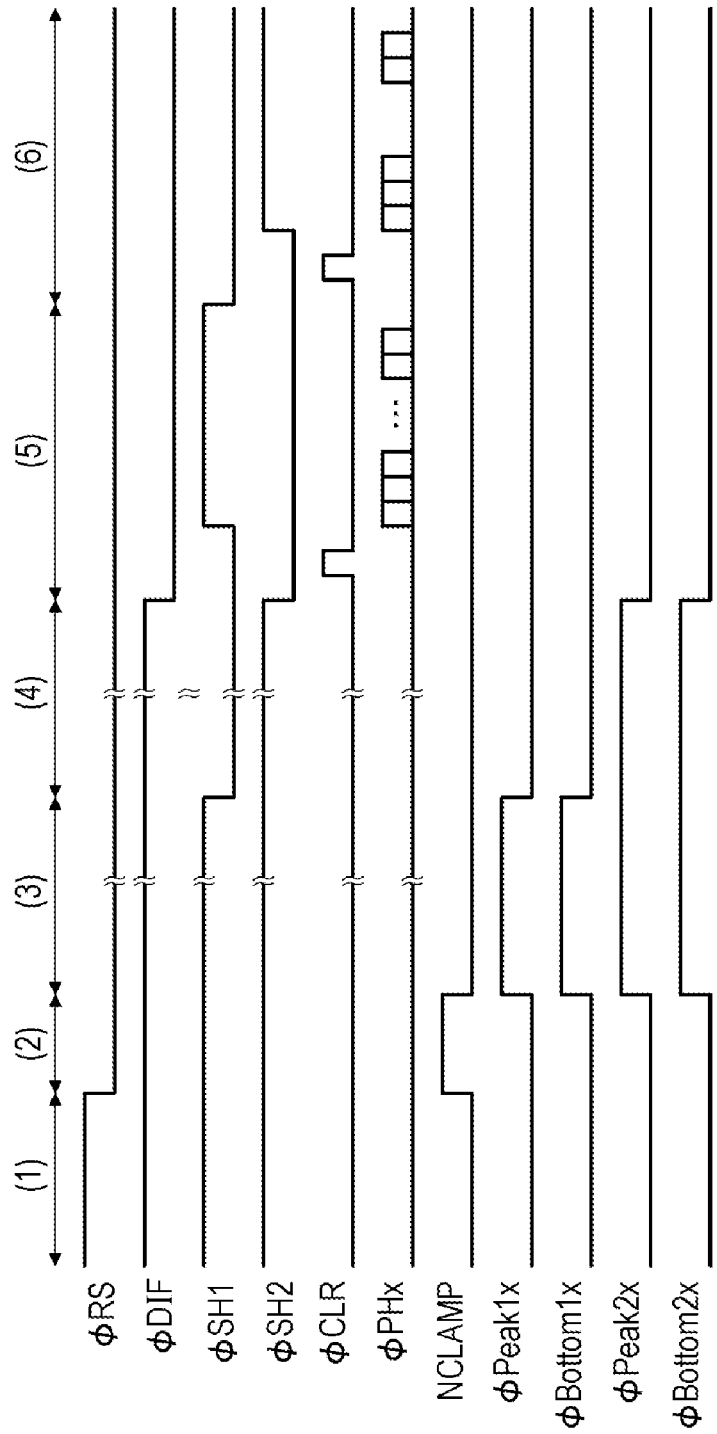
FIG. 4 is a timing chart illustrating the operation of a photoelectric conversion apparatus according to a first embodiment.

Next, the operation of the photoelectric conversion apparatus according to this embodiment will be described with reference to FIG. 4. FIG. 4 is a timing chart illustrating chronological changes in signals that are supplied to the switches illustrated in FIGS. 2 and 3. In the following description, each switch is assumed to be closed when the corresponding signal is at a high level. In FIG. 4, a signal NCLAMP is a signal for controlling when to cause the noise reduction circuits 206 to clamp signals output from the buffer unit 204.

In a period (1), the signals φRS, φDIF, φSH1, and φSH2 are at a high level. That is, in this state, the PD 301 is reset by the power supply voltage VRS, and the output of the differential amplification unit 202 is supplied to capacitive elements of the first and second memory cell units 203.

In a period (2), the signal φRS is at a low level, and the PD 301 begins the accumulation period. At this time, because the switch 302 turns off, noise (hereinafter referred to as "reset noise") is generated and superimposed upon the PD 301. Since the signal φDIF is at a high level, the buffer unit 204 outputs signals (N signals) containing the reset noise of the sensor cell unit 201 and the offset caused by the differential amplification unit 202. The first and second noise reduction circuits 206 clamp the N signals at this moment in accordance with the signals NCLAMP. Since light is still radiated onto the PD 301 during the period (2), photoelectric conversion is performed in the PD 301; however, because the period (2) is sufficiently short compared to the total accumulation period of the sensor cell unit 201, a signal (an S signal) caused by the photoelectric conversion performed during this period can be ignored. Therefore, signals clamped by the first and second noise reduction circuits 206 can be regarded as the N signals.

In a period (3), signals stored in the PD 301 are monitored. In the period (3), the signals φPeak1x, φBottom1x, φPeak2x, and φBottom2x are at a high level. Because the signals φPeak1x and φBottom1x are supplied to unit pixels included in Regions I illustrated in FIG. 1 and the signals φPeak2x and φBottom2x are supplied to unit pixels included in Regions II illustrated in FIG. 1, the switches 209 to 212 in the corresponding unit pixels are closed. Therefore, the signals regarding maximum values and minimum values in Regions I appear in the first common output lines 213, and the signals regarding maximum values and minimum values in Regions II appear in the second common output lines 214. The first accumulation control unit 215 and the second accumulation control unit 216 calculates the differences between the maximum values and the minimum values in the corresponding regions and compare the differences with predetermined threshold values. If it has been judged as a result of the comparison that the difference (P–B; Peak–Bottom) between a maximum value and a minimum value exceeds a threshold value, the first accumulation control unit 215 or the second accumulation control unit 216 controls the corresponding sensor cell unit 201 such that the sensor cell unit 201 performs a holding operation. More specifically, the first accumulation control unit 215 changes the signal φSH1 to a low level, and the second accumulation control unit 216 changes the signal φSH2 to a low level. Accordingly, a signal output from the corresponding differential amplification unit 202 is held in the first memory cell unit 203(*a*) in each unit pixel included in Regions I. In FIG. 4, a point of time when the signal φSH1 is changed to a low level is regarded as the end of the period (3).

It is to be noted that the threshold values set in the first accumulation control unit 215 and the second accumulation control unit 216 may be the same, or may be different from each other.

After the signal φSH1 has been changed to a low level, the storage operation in Regions II continues to be performed in a period (4). If the differences between the maximum values and the minimum values in Regions II exceed the threshold value, the second accumulation control unit 216 changes the signal φSH2 to a low level. Accordingly, a signal output from the corresponding differential amplification unit 202 is held in the second memory cell unit 203(*b*) in each unit pixel included in Regions II. When the above operation has been performed, the signal storage operation relating to Regions I and Regions II ends. Because the signal φDIF is changed to a low level in accordance with the change of the signal φSH2 to a low level, even if the output of the sensor cell unit 201 changes after that, the output is not transmitted to the buffer unit 204.

In a period (5), an operation in which the signal held in the first memory cell unit 203(*a*) in each unit pixel included in Regions I is output to the first common output lines 213 is performed. First, the signal φCLR is temporarily shifted to a high level, and accordingly the input portion of the buffer unit 204 is reset. After that, the signal φSH1 is changed to a high level and supplied to the buffer unit 204 corresponding to the signal held in the first memory cell unit 203(*a*) in each unit pixel included in Regions I. Because the switch 209 in each unit pixel included in Regions I is sequentially turned on with the signal φPHx during this period, the signal in each unit pixel included in Regions I at a time when the period (3) has ended is output to the first common output lines 213. However, if the capacitance of the first memory cell unit 203(*a*) is assumed to be C1 and the parasitic capacitance associated with the input portion of the buffer unit 204 is assumed to be Cbuf, the signal held in the first memory cell unit 203(*a*) is attenuated by a ratio C1/(C1+Cbuf). After each signal in Regions I is output to the first common output lines 213, the signal φSH1 is changed to a low level, and accordingly the first memory cell unit 203(*a*) is disconnected from the buffer unit 204.

During a period (6), the same operation performed on the first memory cell unit 203(*a*) in the period (5) is performed on each second memory cell unit 203(*b*) in Regions II, that is, the signal held in each second memory cell unit 203(*b*) in Regions II is sequentially output to the second common output lines 214. Thus, the signal in each unit pixel included in Regions II at a time when the period (4) has end is output to the second common output lines 214. In this case, too, if the capacitance of the second memory cell unit 203(*b*) is assumed to be C2 and the parasitic capacitance associated with the input portion of the buffer unit 204 is assumed to be Cbuf, the signal held in the second memory cell unit 203(*b*) is attenuated by a ratio C2/(C2+Cbuf). By matching the capacitances C1 and C2 of the first and second memory cell units 203 to each other, signal processing performed at a later stage can be prevented from being complex.

By the operation described above, signals based on different accumulation periods can be obtained from the sensor cell unit 201 in a single storage sequence, as is the case with the AF apparatus described in Japanese Patent Laid-Open No. 2006-220684. That is, as has been described with reference to FIGS. 2 and 3, when the photoelectric conversion apparatus according to this embodiment is applied to an AF apparatus, increase in the area can be suppressed even if a plurality of memories are provided for a single sensor cell unit, and a high-speed AF operation can be realized.

One of the characteristics of the operation according to this embodiment is that the input portion of the buffer unit 204 is reset to a certain electric potential prior to an operation in which each memory cell unit is caused to output a signal through the buffer unit 204. That is, in the same unit pixel, after a signal has been read out from a memory cell unit, the input portion of the buffer unit 204 is reset prior to an operation in which a signal is read out from another memory cell unit. Therefore, the effect of the previous electric potential of the input portion of the buffer unit 204 can be suppressed, and accordingly deterioration of signals can be suppressed.

Second Embodiment

Figure 5:
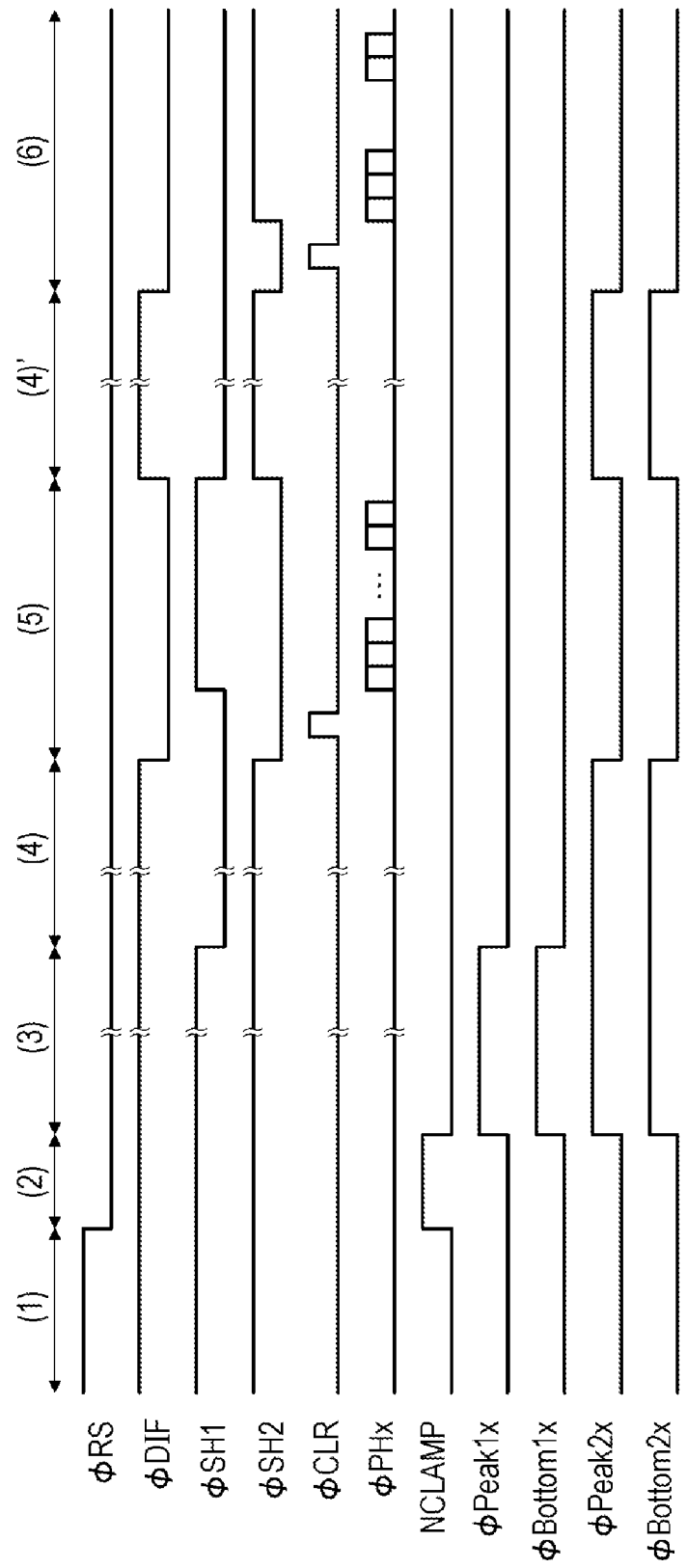
FIG. 5 is a timing chart illustrating the operation of a photoelectric conversion apparatus according to a second embodiment.

Next, an operation according to a second embodiment of the present invention will be described with reference to a timing chart of FIG. 5. The difference from the first embodiment is that the operation in a period (4') is performed between the period (5) and the period (6) illustrated in FIG. 4. Description of the same operations as those according to the first embodiment is omitted.

The operation according to this embodiment is assumed to be performed in a situation in which the difference (P−B) between a maximum value and a minimum value in Regions II has not reached a predetermined threshold value. For example, there may be a situation in which sufficient contrasts can be obtained in Regions I, which are the entirety of the line sensor units L1A and L1B, but sufficient contrasts cannot be obtained in Regions II, which are portions around the centers of the line sensor units L1A and L1B.

In the first embodiment, when "P−B" in Regions II has exceeded a predetermined threshold value, the signals φPeak2x, φBottom2x, φSH2, and φDIF are changed to a low level, thereby ending the period (4). In this embodiment, however, because "P−B" in Regions II does not exceed the threshold value even after a predetermined period has elapsed, the signals φPeak2x, φBottom2x, φSH2, and φDIF are forcibly changed to a low level.

In the period (5), as is the case with the first embodiment, a signal in each unit pixel included in Regions I at a time when the period (3) has end is output through the first common output lines 213.

Although the operation in which a signal in each unit pixel included in Regions II at a time when the period (4) has end is output is performed after the period (5) in the first embodiment, the operation in the period (4'), where a signal in each unit pixel included in Regions II is monitored, is performed in this embodiment. In the period (4'), the signals φDIF, φSH2, φPeak2x, and φBottom2x are changed to a high level again, and the signal φSH1 is changed to a low level. Accordingly, as is the case with the period (4), the maximum value and the minimum value from among signals in each unit pixel included in Regions II appear in the first common output lines 213, and the difference therebetween is monitored by the first accumulation control unit 215. When "P−B" that is monitored by the first accumulation control unit 215 exceeds a predetermined threshold value, the first accumulation control unit 215 changes the signals φPeak2x, φBottom2x, φSH2, and φDIF to a low level.

The operation in the period (6) is the same as that according to the first embodiment, and therefore description thereof is omitted.

When the photoelectric conversion apparatus according to this embodiment described above is applied to an AF apparatus, increase in the area can be suppressed even if a plurality of memories are provided for a single sensor cell unit, and a high-speed AF operation can be realized. In particular, since the signals in Regions I are output before the monitoring operation relating Regions II ends, AF can be performed based on the signals relating to Regions I, which realizes an AF operation at even higher speed.

Third Embodiment

Figure 6:
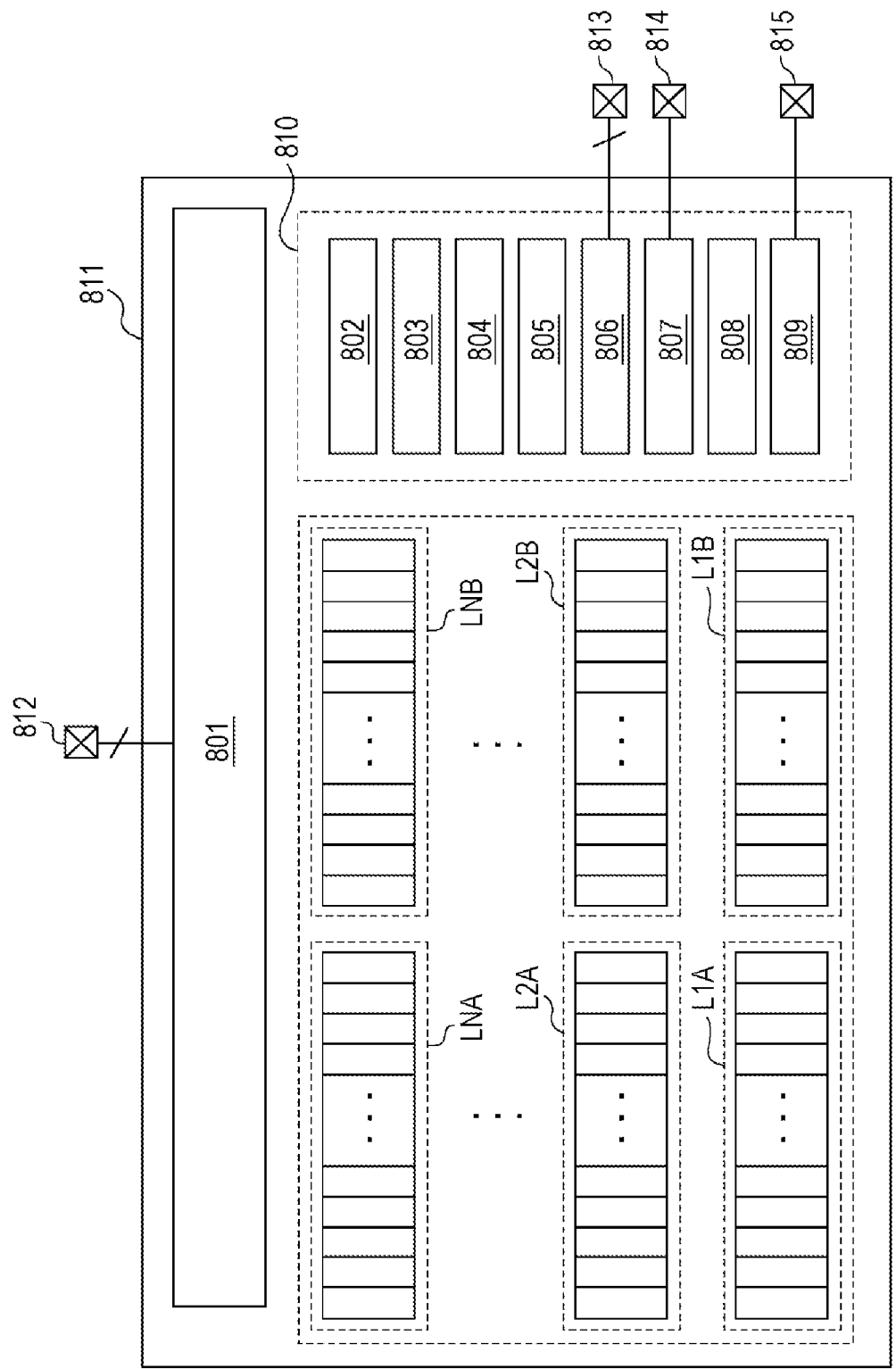
FIG. 6 is a block diagram illustrating the configuration of an auto-focusing apparatus according to a third embodiment.

A third embodiment of the present invention will be described with reference to FIG. 6. FIG. 6 is a block diagram illustrating an example of the configuration of a photoelectric conversion apparatus according to an embodiment of the present invention at a time when the photoelectric conversion apparatus is applied to a phase difference detection AF apparatus (hereinafter referred to as an AF sensor).

An AF sensor 811 includes a sensor block in which line sensor units L1A and L1B, L2A and L2B, and LNA and LNB are arranged, a logic block 801 having a function of generating a timing signal for an external interface and the AF sensor, and an analog circuit block 810.

The analog circuit block 810 has accumulation control units 802 to 805, monitors signals from the line sensor units, and controls the accumulation period. The analog circuit block 810 further includes a reference voltage/current generating circuit 806 that generates the reference voltage and the reference current to be used in the photoelectric conversion apparatus, a thermometer circuit 807, and the like. Terminals 813 and 814 are used to output signals generated by the reference voltage/current generating circuit 806 and the thermometer circuit 807 to the outside.

The logic block 801 controls the drive timing of the AF sensor 811 by serial communication with the outside through a serial communication terminal 812. The signals from the line sensor units are amplified by an AF gain circuit 808 and output from an analog signal output terminal 815 through an output multiplexer 809.

In this embodiment, too, a high-speed AF operation can be realized by using the photoelectric conversion apparatus according to the first or second embodiment.

Fourth Embodiment

A fourth embodiment of the present invention will be described with reference to FIG. 6. FIG. 6 is a block diagram illustrating an example of the configuration of a photoelectric conversion apparatus in the present invention at a time when the photoelectric conversion apparatus is applied to an AF apparatus (hereinafter referred to as an AF sensor) adopting a phase difference detection method.

An AF sensor 811 includes a sensor block in which line sensor units L1A and L1B, L2A and L2B, and LNA and LNB are arranged, a logic block 801 having a function of generating a timing signal for an external interface and the AF sensor, and an analog circuit block 810.

The analog circuit block 810 has AGC circuits 802 to 805, monitors signals from the line sensor units, and controls the accumulation period. The analog circuit block 810 is formed by further including a reference voltage/current generating circuit 806 that generates the reference voltage and the reference current to be used in the photoelectric conversion apparatus, a thermometer circuit 807, and the like.

The logic block 801 controls the drive timing of the AF sensor 811 by serial communication with the outside through a serial communication terminal 812.

In this embodiment, too, a high-speed AF operation can be realized by using the photoelectric conversion apparatus according to the first or second embodiment.

Fifth Embodiment

Figure 7:
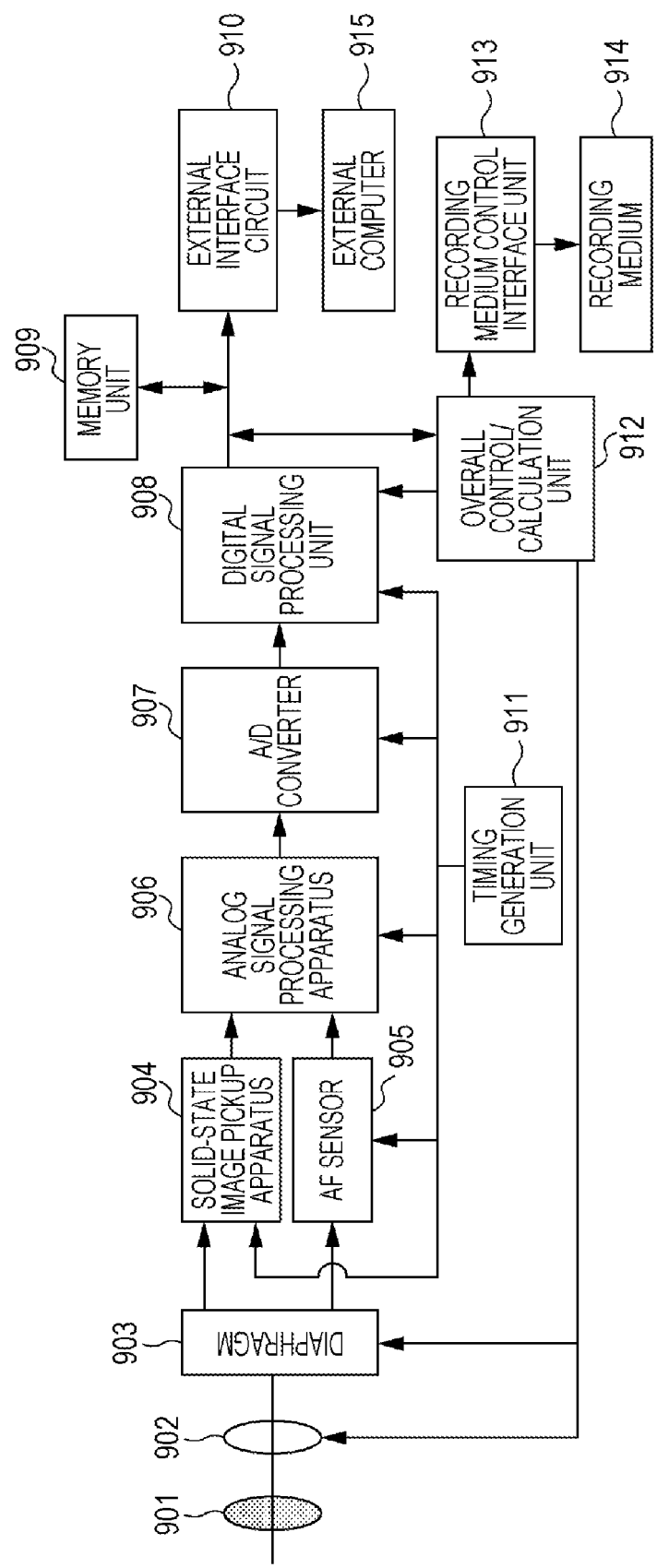
FIG. 7 is a block diagram illustrating the configuration of an image pickup system according to a fourth embodiment.

FIG. 7 is a block diagram illustrating an example of the configuration of an image pickup system according to a fifth embodiment of the present invention.

A barrier 901 protects a lens, which will be described later. A lens 902 provides an optical image of an object to a solid-state image pickup apparatus 904. A diaphragm 903 adjusts the amount of light that has passed through the lens 902. The solid-state image pickup apparatus 904 obtains an optical image of an object that has been provided from the lens 902 as an image signal. An AF sensor 905 uses the photoelectric conversion apparatus according to each embodiment that has been described above.

An analog signal processing apparatus 906 processes signals output from the solid-state image pickup apparatus 904 and the AF sensor 905. An analog-to-digital (A/D) converter 907 performs A/D conversion on a signal output from the analog signal processing apparatus 906. A digital signal processing unit 908 performs various types of correction and compression on image data output from the A/D converter 907.

A memory unit 909 temporarily stores image data. An external interface circuit 910 is used to communicate with an external computer or the like. A timing generation unit 911 outputs various timing signals to the digital signal processing unit 908 and the like. An overall control/calculation unit 912 performs various types of calculation and controls the entirety of a camera. A recording medium control interface unit 913, a recording medium 914 such as a semiconductor memory that is removable and that is used to record obtained image data or read out recorded image data, and an external computer 915 are also included.

Next, an operation at a time when the image pickup system captures an image will be described.

The barrier 901 is opened, and the overall control/calculation unit 912 calculates the distance to an object by the above-mentioned phase difference detection method based on a signal output from the AF sensor 905. After that, the lens 902 is driven based on the result of the calculation, and whether or not the lens 902 is in focus is judged. When it has been judged that the lens 902 is not in focus, AF control for driving the lens 902 is performed again. Next, after it has been judged that the lens 902 is in focus, the solid-state image pickup apparatus 904 begins a storage operation. After the storage operation performed by the solid-state image pickup apparatus 904 has end, an image signal output from the solid-state image pickup apparatus 904 is subjected to A/D conversion in the A/D converter 907, passes through the digital signal processing unit 908, and written in the memory unit 909 by overall control and calculation. After that, the data stored in the memory unit 909 is recorded on the recording medium 914 through the recording medium control interface unit 913 by control performed by the overall control/calculation unit 912. Alternatively, the data may be directly stored in the external computer 915 through the external interface circuit 910.

Although a configuration in which each unit pixel has two memory cell units has been described in the above-described embodiments, each unit pixel may be configured to have three or more memory cell units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-119389 filed May 25, 2010, which is hereby incorporated by reference herein in its entirety.

What is claimed is:

1. A photoelectric conversion apparatus comprising:
   a plurality of unit pixels each including:
      a sensor cell unit that includes a photoelectric conversion unit;
      an amplification unit configured to amplify signals output from the sensor cell unit;
      a plurality of memory cell units, each including a capacitor and a switch connected in series, and configured to hold the amplified signals, the switches of the plurality of memory cells being provided in parallel to each other; and
      a buffer unit that is provided for the plurality of memory cell units and transmits the signals held by the plurality of memory cell units,
   wherein the amplification unit includes a differential amplification unit configured to output a difference between an output of the buffer unit and a signal output from the sensor cell unit.

2. The photoelectric conversion apparatus according to claim 1,
   wherein the plurality of unit pixels each includes a reset unit configured to reset an input portion of the buffer unit.

3. The photoelectric conversion apparatus according to claim 2, further comprising:
   a plurality of line sensor units in which the plurality of sensor cell units are arranged in a one-dimensional manner,
   wherein auto focusing is performed based on signals obtained from a pair of line sensor units.

4. The photoelectric conversion apparatus according to claim 3,
   wherein the plurality of unit pixels each includes a minimum value detection unit and a maximum value detection unit,
   wherein the photoelectric conversion apparatus further includes a pair of first common output lines and a pair of second common output lines,
      wherein a number of minimum value detection units connected to one of the pair of first common output lines being different from a number of minimum value detection units connected to one of the pair of second common output lines, and a number of maximum value detection units connected to the other of the pair of the first common output lines being different from a number of maximum value detection units connected to the other of the pair of the second common output lines.

5. The photoelectric conversion apparatus according to claim 4, further comprising:
   a first accumulation control unit configured to cause the plurality of memory cell units to store signals based on a maximum value and a minimum value output to the pair of first common output lines; and
   a second accumulation control unit configured to cause the plurality of memory cell units to store signals based on a maximum value and a minimum value output to the pair of second common output lines.

6. The photoelectric conversion apparatus according to claim 5,
   wherein, in a same unit pixel, after a signal held in one of the plurality of memory cell units has been output from a corresponding buffer unit, the reset unit resets, prior to an operation in which a signal held in another one of the plurality of memory cell units is output from a corresponding buffer unit, an input portion of the corresponding buffer unit.

7. The photoelectric conversion apparatus according to claim 5, wherein the first accumulation control unit causes one of the plurality of memory cell units to hold a signal output from a corresponding sensor cell unit, and wherein, after the second accumulation control unit has caused another one of the plurality of memory cell units to hold a signal output from a corresponding sensor cell unit and the signal held in the one of the plurality of memory cell units has been output to the pair of first common output lines, the second accumulation control unit causes the another one of the plurality of memory cell units to hold the signal output from the corresponding sensor cell unit again prior to an operation in which the signal held in the another one of the plurality of memory cell units is output to the pair of second common output lines.

8. An image pickup system comprising:

the photoelectric conversion apparatus according to claim 1; and a solid-state image pickup apparatus.

9. The image pickup system according to claim 8, wherein the plurality of unit pixels each includes a reset unit configured to reset an input portion of the buffer unit.

10. The system according to claim 9, wherein the photoelectric conversion apparatus further comprises:

a plurality of line sensor units in which the plurality of sensor cell units are arranged in a one-dimensional manner, wherein auto focusing is performed based on signals obtained from a pair of line sensor units.

11. The system according to claim 10, herein the plurality of unit pixels each includes a minimum value detection unit and a maximum value detection unit, wherein the photoelectric conversion apparatus further includes a pair of first common output lines and a pair of second common output lines, wherein a number of minimum value detection units connected to one of the pair of first common output lines being different from a number of minimum value detection units connected to one of the pair of second common output lines, and a number of maximum value detection units connected to the other of the pair of the first common output lines being different from a number of maximum value detection units connected to the other of the pair of the second common output lines.

12. The system according to claim 11, wherein the photoelectric conversion apparatus further comprises:

a first accumulation control unit configured to cause the plurality of memory cell units to store signals based on a maximum value and a minimum value output to the pair of first common output lines; and a second accumulation control unit configured to cause the plurality of memory cell units to store signals based on a maximum value and a minimum value output to the pair of second common output lines.

13. The system according to claim 12, wherein, in a same unit pixel, after a signal held in one of the plurality of memory cell units has been output from a corresponding buffer unit, the reset unit resets, prior to an operation in which a signal held in another one of the plurality of memory cell units is output from a corresponding buffer unit, an input portion of the corresponding buffer unit.

14. The system according to claim 12, wherein the first accumulation control unit causes one of the plurality of memory cell units to hold a signal output from a corresponding sensor cell unit, and wherein, after the second accumulation control unit has caused another one of the plurality of memory cell units to hold a signal output from a corresponding sensor cell unit and the signal held in the one of the plurality of memory cell units has been output to the pair of first common output lines, the second accumulation control unit causes the another one of the plurality of memory cell units to hold the signal output from the corresponding sensor cell unit again prior to an operation in which the signal held in the another one of the plurality of memory cell units is output to the pair of second common output lines.

15. A photoelectric conversion apparatus comprising:

a plurality of unit pixels each including:

a sensor cell unit that includes a photoelectric conversion unit;

an amplification unit configured to amplify signals output from the sensor cell unit;

a plurality of memory cell units configured to hold the amplified signals; and a buffer unit that is provided for the plurality of memory cell units and transmits the signals held by the plurality of memory cell units, wherein the amplification unit includes a differential amplification unit configured to output a difference between an output of the buffer unit and a signal output from the sensor cell unit, wherein the plurality of unit pixels each includes a minimum value detection unit and a maximum value detection unit, wherein the photoelectric conversion apparatus further includes a pair of first common output lines and a pair of second common output lines, wherein a number of minimum value detection units connected to one of the pair of first common output lines being different from a number of minimum value detection units connected to one of the pair of second common output lines, and a number of maximum value detection units connected to the other of the pair of the first common output lines being different from a number of maximum value detection units connected to the other of the pair of the second common output lines.

16. The photoelectric conversion apparatus according to claim 15, further comprising:

a first accumulation control unit configured to cause the plurality of memory cell units to store signals based on a maximum value and a minimum value output to the pair of first common output lines; and a second accumulation control unit configured to cause the plurality of memory cell units to store signals based on a maximum value and a minimum value output to the pair of second common output lines.

17. The photoelectric conversion apparatus according to claim 16, wherein, in a same unit pixel, after a signal held in one of the plurality of memory cell units has been output from a corresponding buffer unit, the reset unit resets, prior to an operation in which a signal held in another one of the plurality of memory cell units is output from a corresponding buffer unit, an input portion of the corresponding buffer unit.

18. The photoelectric conversion apparatus according to claim 16, wherein the first accumulation control unit causes one of the plurality of memory cell units to hold a signal output from a corresponding sensor cell unit, and wherein, after the second accumulation control unit has caused another one of the plurality of memory cell units to hold a signal output from a corresponding sensor cell unit and the signal held in the one of the plurality of memory cell units has been output to the pair of first common output lines, the second accumulation control unit causes the another one of the plurality of memory cell units to hold the signal output from the corresponding sensor cell unit again prior to an operation in which the signal held in the another one of the plurality of memory cell units is output to the pair of second common output lines.

19. A driving method of a photoelectric conversion apparatus, the photoelectric conversion apparatus comprising:
 a plurality of unit pixels each including:
  a sensor cell unit that includes a photoelectric conversion unit;
  an amplification unit configured to amplify signals output from the sensor cell unit;
  a plurality of memory cell units, each including a capacitor and a switch connected in series, and configured to hold the amplified signal, the switches of the plurality of memory cells being provided in parallel to each other;
 the driving method including:
 outputting, by the amplification unit, the amplified signal to one of the plurality of memory cell units in a part of a period being overlapped with a part of a period that the amplification unit outputs the amplified signal to the other of the plurality of memory cell units.

20. The driving method according to claim 19, further including:
 outputting a first signal held in one of the plurality of memory cell units from the buffer unit of one the unit pixels; and
 resetting an input portion of the buffer unit after outputting the first signal from the buffer unit, and prior to outputting a second signal held in another one of the plurality of memory cell units from the buffer unit of the same one of the unit pixels.

* * * * *